United States Patent [19]
Faler et al.

[11] Patent Number: 4,791,234
[45] Date of Patent: Dec. 13, 1988

[54] SUBSTANTIALLY PURE SPIROBIINDANE BISPHENOLS AND METHOD FOR THEIR PREPARATION

[75] Inventors: Gary R. Faler; Jerry C. Lynch, both of Scotia, N.Y.

[73] Assignee: General Electric Company, Schenectady, N.Y.

[21] Appl. No.: 917,644

[22] Filed: Oct. 10, 1986

[51] Int. Cl.[4] ............................................. C07C 39/12
[52] U.S. Cl. .................................. 568/719; 568/721; 568/729
[58] Field of Search ................. 568/719, 729, 721

[56] References Cited

U.S. PATENT DOCUMENTS

| | | | |
|---|---|---|---|
| 2,979,534 | 4/1961 | Petropoulos et al. | 568/719 |
| 3,271,463 | 9/1966 | Howard | 568/719 |
| 4,552,949 | 11/1985 | Mark | 568/719 |
| 4,605,789 | 8/1986 | Silvis et al. | 568/719 |
| 4,701,567 | 10/1987 | Tanabe et al. | 568/719 |

FOREIGN PATENT DOCUMENTS

| | | | |
|---|---|---|---|
| 653835 | 3/1963 | Canada | 568/719 |
| 708652 | 4/1965 | Canada | 568/719 |

OTHER PUBLICATIONS

Baker et al., *J. Chem. Soc.*, 1421 (1939).
Curtis, *J. Chem. Soc.*, 415 (1962).
Stueben, *J. Poly. Sci., Part A*, 3, 3209 (1965).

Primary Examiner—Werren B. Lone
Attorney, Agent, or Firm—William H. Pittman; James C. Davis, Jr.; James Magee, Jr.

[57] ABSTRACT

Spirobiindane bisphenols of high purity, suitable for conversion to high molecular weight polycarbonates, are prepared by reacting a bisphenol or 4-isopropenylphenol with a metal halide Lewis acid or an alkanesulfonic acid, followed by removing impurities including phenols, 1-(4-hydroxyphenyl)indanols and the like. A step of purification by precipitation with water from a methanol-methylene chloride solution is included.

20 Claims, 1 Drawing Sheet

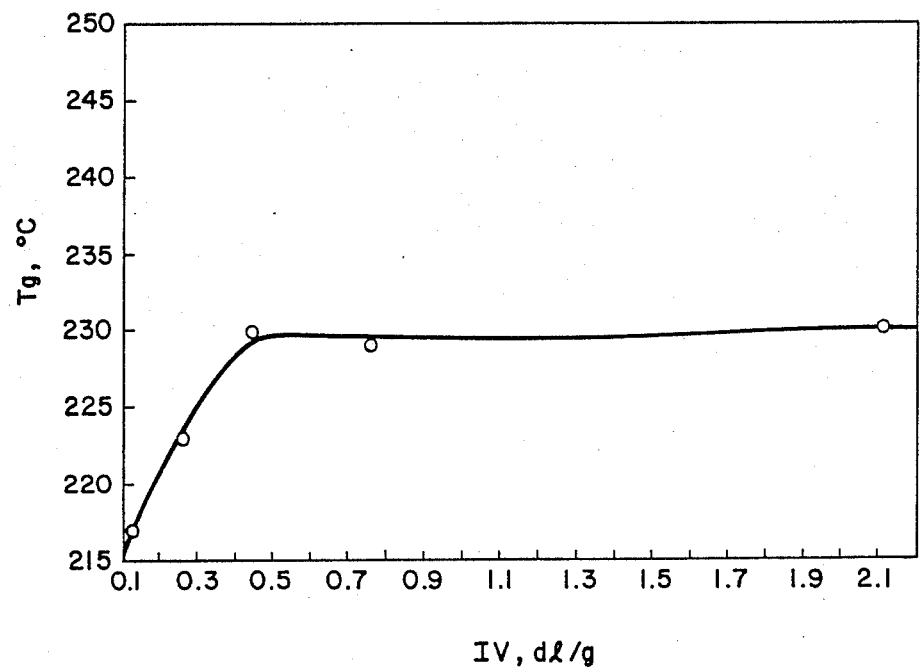

SUBSTANTIALLY PURE SPIROBIINDANE BISPHENOLS AND METHOD FOR THEIR PREPARATION

This invention relates to the preparation and purification of spirobiindane bisphenols, and to substantially pure spirobiindane bisphenols so prepared.

Spirobiindane bisphenols of the formula

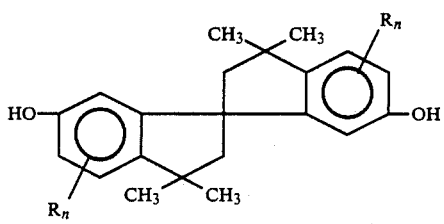

wherein each R is independently $C_{1-4}$ primary or secondary alkyl or halo and n is from 0 to 3 and methods for their preparation have been known for some time. The prior art also discloses their conversion to polycarbonates and other polymers. In addition, compositions comprising cyclic polycarbonate oligomers of spirobiindane bisphenols are disclosed and claimed in copending, commonly owned application Ser. No. 887,503, filed July 21, 1986, and are shown to possess unique and advantageous properties.

The preparation of spirobiindane bisphenols by the condensation of bisphenols in the presence of acidic catalysts is disclosed in various references. For example, Baker et al., *J. Chem. Soc.*, 1421–1424 (1939), describes the preparation of a compound of formula I in which R is methyl and n is 1 by the condensation of 2,2-bis(3-methyl-4-hydroxyphenyl)propane with concentrated hydrochloric acid. A similar condensation of 2,2-bis(4-hydroxyphenyl)propane, or bisphenol A, is disclosed in Curtis, *J. Chem. Soc.*, 415–418 (1962).

U.S. Pat. No. 2,979,534 describes the conversion of bisphenols such as bisphenol A to 1-(4-hydroxyphenyl)indanols by means of aromatic sulfonic acids such as benzenesulfonic or p-toluenesulfonic acid or mineral acids such as sulfuric acid. It was later found that the principal products were the corresponding spirobiindane bisphenols; Stueben, *J. Poly. Sci., Part A*, 3, 3209–3217 (1965). The preparation of compounds of this type by condensation of bisphenol A in the presence of sulfuric acid is also described in U.S. Pat. No. 3,271,463, in the presence of anhydrous methanesulfonic acid or hydrochloric acid in U.S. Pat. No. 4,552,949, and in the presence of strong acid cation exchange resins in U.S. Pat. No. 4,605,789.

The products produced by the above-described procedures are frequently obtained in low yield and so impure as to make their conversion to high molecular weight polycarbonates impossible. (It is known that bisphenols must be of very high purity for effective polycarbonate production.) Various multi-step purification procedures have been described which are troublesome, time-consuming and ineffective to afford a product sufficiently pure for converting to high molecular weight polymer.

For example, the Stueben purification method requires extensive washing with chloroform, conversion to the disodium salt and four successive recrystallizations thereof, followed by reconversion to the free bisphenol and still another recrystallization. The method of U.S. Pat. No. 3,271,463, which includes recrystallization from toluene, produces a product which, although shown to be pure by melting point, high pressure liquid chromatography and gas chromatography, is light brown in color and affords only a relatively low molecular weight polycarbonate. The method of U.S. Pat. No. 4,605,789 when applied to 2,2-bis(3,5-dimethyl-4-hydroxyphenyl)propane affords only a 67% yield of the appropriate spirobiindane bisphenol.

Another disadvantage of spirobiindane bisphenol preparation by condensation of bisphenols with mineral acids is the large quantity of acid required. The prior art methods employing sulfuric, hydrochloric and hydrobromic acids typically require said acid in excess of the weight of the bisphenol, frequently in large excess. Such procedures are wasteful of acid.

The present invention includes a method for preparing spirobiindane bisphenols of high purity in relatively high yields, using relatively small amounts of catalyst. It also includes substantially pure 6,6'-dihydroxy-3,3,3',3'-tetramethyl-1,1'-spirobiindane as produced by said method. These high purity materials can be converted to very high molecular weight polycarbonates.

In one of its aspects, the invention includes a method for preparing substantially pure spirobiindane bisphenols of formula I which comprises the steps of:

(A) reacting at least one of bisphenols of the formula

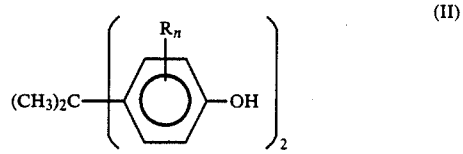

and isopropenylphenols of the formula

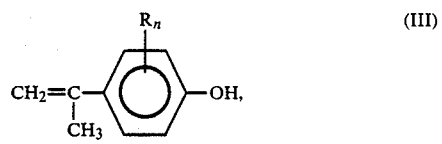

wherein R and n are as previously defined, by contact at a temperature in the range of about 100°–200° C. with an acidic catalyst selected from the group consisting of alkanesulfonic acids and polyvalent metal halides which are strong Lewis acids, thereby producing a crude spirobiindane bisphenol:

(B) removing a major proportion of the by-products including phenols of the formula

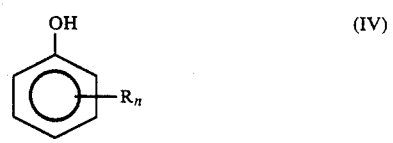

and 1-(4-hydroxyphenyl)indanols of the formula

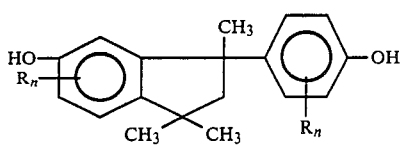

(V)

from the crude spirobiindane bisphenol; and (C) further purifying the product of step B by dissolution in a mixture of methanol and methylene chloride followed by precipitation by addition of water.

The spirobiindane bisphenols of formula I which may be produced by the method of this invention include 6,6'-dihydroxy-3,3,3',3'-tetramethyl-1,1'-spirobiindane (hereinafter "SBI"), which is usually preferred. Also included are various alkyl- or halo-substituted analogs of SBI, especially those in which n is 1 or 2 and R is methyl, chloro or bromo.

The method of this invention comprises three successive stages, the first being a preparation stage and the second and third purification stages. The reactants useful in stage A include bisphenols of formula II. Illustrative bisphenols are bisphenol A, 2,2-bis(3,5-dibromo-4-hydroxyphenyl)propane, 2,2-bis(3,5-dimethyl-4-hydroxyphenyl)propane and 2,2-bis(3-methyl-4-hydroxyphenyl)propane. It has now been discovered that the corresponding isopropenylphenols of formula III, or mixtures of bisphenols and isopropenylphenols, may also be used. The preferred compounds are bisphenol A and p-isopropenylphenol. The latter compound may be obtained by cracking of by-product streams from the preparation of bisphenol A.

In stage A, at least one of the bisphenol and isopropenylphenol is contacted with an acidic catalyst which may be an alkanesulfonic acid. The preferred alkanesulfonic acids are those containing $C_{1-4}$ primary or secondary alkyl groups, illustrated by methyl, ethyl, 2-propyl and 1-butyl. Methanesulfonic acid is especially preferred by reason of its availability and effectiveness.

Also useful as catalysts are the polyvalent metal halides which are strong Lewis acids. These are generally identical to the metal halides classed as "very active" Friedel-Crafts catalysts in Olah et al., J. Am. Chem. Soc., 94, 7448-7461 (1972). Those halides are $AlCl_3$, $AlBr_3$, $AlI_3$, $GaCl_2$, $GaCl_3$, $GaBr_3$, $GaI_3$, $ZrCl_4$, $HfBr_4$, $HfI_4$, $SbF_5$, $NbF_5$, $NbCl_5$, $TaF_5$, $TaCl_5$, $TaBr_5$, $MoF_6$ and $MoCl_5$. For reasons of availability and effectiveness, the aluminum halides are preferred, with aluminum chloride being most preferred.

As between methanesulfonic acid and aluminum chloride, the former is usually most preferred by reason of its effectiveness for the production of spirobiindane bisphenols in high yield and particularly high purity. However, aluminum chloride requires a very short reaction time and may be used when some sacrifice in yield and purity is tolerable for the sake of rapid completion.

The reaction is conducted at temperatures within the range of about 100°-200° C., preferably about 125°-175° C. It may be conducted in the melt or in solution in a suitable relatively high boiling organic medium such as phenol, o-dichlorobenzene or 1,2,4-trichlorobenzene.

The proportion of acidic compound, based on bisphenol or isopropenylphenol, is not critical and may be, for example, within the range of about 0.3-10% by weight. The preferred range is about 1-5%. Below 0.5% the reaction rate may drop off sharply, and the yield of by-product 1-(4-hydroxyphenyl)indanol may increase at the expense of spirobiindane bisphenol. On the other hand, little or no advantage has been detected in the use of amounts above 5%.

The time required for completion of the reaction is generally no greater than about 6 hours, although longer reaction times may be employed with no noticeable decrease in product yield. As previously noted, the reaction is complete somewhat earlier when aluminum chloride is used as a catalyst than when an alkanesulfonic acid is used.

Stage B is the removal of a major proportion of the by-products from the crude spirobiindane bisphenol. The by-products present in highest proportion are phenols of formula IV and 1-(4-hydroxyphenyl)indanols of formula V; in SBI preparation, phenol and 1-(4-hydroxyphenyl)-1,3,3-trimethyl-6-indanol. The former is formed by cracking of bisphenol A to 4-isopropenylphenol, and the latter by dimerization of the isopropenylphenol.

Phenols, especially phenol itself, may be conveniently removed by simple water washing and/or steam distillation. Removal of 1-(4-hydroxyphenyl)indanols may be achieved by dissolution in an organic liquid which is a solvent therefor but which does not dissolve the spirobiindane bisphenol in major amounts. Such liquids include aromatic hydrocarbons (e.g., benzene toluene) and chlorinated aliphatic hydrocarbons (e.g., methylene chloride, chloroform, 1,1,2,2-tetrachloroethane). Methylene chloride is preferred.

The 1-(4-hydroxyphenyl)indanol by-product removed in stage B may be combined with additional bisphenol and/or isopropenylphenol and converted to spirobiindane bisphenol. This conversion is disclosed and claimed in copending commonly owned application Ser. No. 917,645, filed Oct. 10, 1986.

Stage C of the method of this invention is the further purification of the product of stage B. Purification is effected by dissolving the crude product in a mixture of methanol and methylene chloride, and adding water to precipitate the substantially pure spirobiindane bisphenol. Very little product loss is observed in this step, since the only materials which are removed are color bodies and other impurities which, although present in extremely minor amount, may have a profound effect on the conversion of the spirobiindane bisphenol to polycarbonate and especially on the molecular weight of the polycarbonate.

The proportions of methanol, methylene chloride and water used in stage C are not critical, and may be adjusted as desired to effect the desired dissolution and precipitation. In general, a volume ratio of methanol to methylene chloride of about 3-6:1 and a volume ratio of water to total methanol and methylene chloride of about 0.8-1.2:1 are suitable.

During the dissolution operation of stage C, a homogeneous solution is formed. Upon addition of water, this is converted into a heterogeneous mixture containing liquid and solid phases. Frequently, two liquid phases and one solid phase are present, the latter being the desired purified spirobiindane bisphenol which resides predominantly in a lower methylene chloride liquid phase. The product may be removed by conventional filtration or centrifugation procedures and, if desired, may be washed with a suitable organic liquid such as methylene chloride and dried at elevated temperature and/or reduced pressure. If desired, stage C may be repeated to obtain material of particularly high purity.

The purity of SBI produced by the method of this invention may be conveniently evaluated in terms of the absorbance at 350 nanometers of a solution of 1 gram thereof in 100 ml. of spectroscopic grade methanol, using a path length of 10 cm. The absorbance value as so measured of the SBI produced by the method of this invention is generally at most 0.06, and preferably no higher than 0.03. This represents a purity not attainable by any prior art method for preparing SBI. Therefore, SBI of this purity is another aspect of the invention.

The method of this invention is illustrated by the following examples. All percentages are by weight unless otherwise indicated.

EXAMPLE 1

A mixture of 1 kilogram of bisphenol A and 50 grams of methanesulfonic acid was heated at 135° C. for 3 hours, during which time it became molten. The molten mixture was poured into 2 liters of water, with stirring, and the precipitated solids were filtered and washed with an additional 2 liters of water. The filtration residue was heated under reflux for 1 hour with 1.5 liters of methylene chloride. The mixture was cooled to −5° C. and filtered, and the residue was washed with an additional liter of cold methylene chloride. Analysis of the product at this point by high pressure liquid chromatography showed it to be 98.5% pure SBI.

The product was dissolved in a mixture of 1 liter of methanol and 200 ml. of methylene chloride, forming a homogeneous solution. Deionized water, 1.2 liters, was added to the solution with stirring, whereupon a three-phase mixture was formed: a lower liquid phase comprising methylene chloride and methanol, an upper liquid phase comprising methylene chloride and water, and a solid phase combined with the lower liquid phase. This mixture was filtered and the residue washed with methylene chloride. The methylene chloride-methanol-water dissolution and precipitation step was repeated and the solid product therefrom was dried in an oven under vacuum. There was obtained 253 grams (57% of theoretical) of substantially pure SBI.

A 1-gram sample of the purified SBI was dissolved in 100 ml. of spectroscopic grade methanol and the ultraviolet absorbance at 350 nm. was determined, using a Varian 219 spectrophotometer having a path length of 10 cm. The absorbance was found to be 0.016.

EXAMPLE 2

Following substantially the procedure of Example 1, bisphenol A and 4-isopropenylphenol were subjected to condensation reactions, using various catalysts in differing concentrations and various temperatures and analyzing the crude product by high pressure liquid chromatography after various time periods. Solvents were employed in certain runs.

The results of these runs are listed in Table I. The following abbreviations are used:
BPA —bisphenol A.
IPP —4-isopropenylphenol.
CD —1-(4-hydroxyphenyl)-1,3,3-trimethyl-6-indanol (the cyclic dimer of 4-isopropenylphenol).
MSA —methanesulfonic acid.
DCB —o-dichlorobenzene.
AC —aluminum trichloride.

The percent of reactant which had been converted to product is designated "Conversion". The columns designated "Yield" indicate the mole percentage proportions of SBI and cyclic dimer in the crude product, based on the total of SBI and cyclic dimer.

TABLE I

| Reactant | Catalyst Identity | Amt., % | Solvent | Temperature °C. | Time hrs. | Yield, SBI | mole % CD | Conversion, % |
|---|---|---|---|---|---|---|---|---|
| BPA | MSA | 5 | — | 100 | 2 | 77 | 23 | 99 |
| BPA | MSA | 5 | — | 165 | 2 | 75 | 25 | 99 |
| BPA | MSA | 5 | DCB | 140 | 4 | 85.4 | 14.5 | 100 |
| BPA | MSA | 5 | Phenol | 140 | 4 | 61.5 | 38.5 | — |
| BPA | MSA | 2.5 | — | 165 | 15 | 75 | 25 | — |
| BPA | MSA | 1 | — | 140 | 15 | 72 | 28 | 100 |
| BPA | AC | 5 | — | 140 | 1 | 79.2 | 20.8 | 100 |
| BPA | AC | 5 | DCB | 100 | 6 | 75.3 | 24.6 | 96 |
| BPA | AC | 1 | — | 140 | 2 | 66.2 | 33.8 | 94 |
| BPA | AC | 0.5 | — | 180 | 15 | 48.8 | 51.1 | 98 |
| BPA | AC | 0.5 | DCB | 180 | 2 | 59.2 | 40.8 | 95.9 |
| IPP | MSA | 4 | — | 140 | 4 | 80 | 20 | 100 |
| IPP | MSA | 4 | — | 180 | 4 | 82 | 18 | 100 |

EXAMPLE 3

A mixture of 50 grams of bisphenol A and 1 gram of aluminum chloride was heated at 140° C. under nitrogen, with stirring, for 15 minutes. The reaction was quenched by the addition of 10 ml. of water and the crude product was analyzed by high pressure liquid chromatography, which showed complete consumption of the bisphenol A.

The mixture was steam distilled to remove by-product phenol and the semi-solid residue was separated by filtration and heated with 75 ml. of methylene chloride for one hour under reflux. The solid product was filtered; after drying in a vacuum oven at 90° C., it had an absorbance of 0.119 as determined by the method described in Example 1.

The crude SBI was dissolved in a mixture of 50 ml. of methanol and 10 ml. of methylene chloride and the solution was poured into 60 ml. of water. The SBI was removed by filtration, purified again with methanol, methylene chloride and water and dried in a vacuum oven. After the second drying step, its absorbance was 0.0508.

EXAMPLE 4

Following the procedure of Example 3, bisphenol A was condensed in the presence of various acidic catalysts in various proportions. The crude product was analyzed after various time periods for the presence of bisphenol A. The results are given in Table II.

TABLE II

| Catalyst | | Time, min. | BPA, % |
|---|---|---|---|
| Identity | Amt., % | | |
| MSA | 5 | 180 | 0 |
| AlCl$_3$ | 8 | 15 | 0 |
| AlCl$_3$ | 4 | 15 | 0 |
| AlCl$_3$ | 0.49 | 360 | 8.6 |

EXAMPLE 5

This example compares the absorbance of SBI products obtained by the condensation of bisphenol A catalyzed by a number of acidic materials, followed in certain cases by purification using various media.

The results are given in Table III. p-Toluenesulfonic acid is designated "TSA". The sample designated "Stueben" was purified by the Stueben method which included four washings with chloroform, air-drying, converting to the disodium salt which was recrystallized five times under nitrogen from an ethanol-water mixture, and reconversion to the free bisphenol which was recrystallized three more times from a methanol-water mixture.

TABLE III

| Catalyst | | Purification medium | Absorbance |
|---|---|---|---|
| Identity | Amt., % | | |
| H$_2$SO$_4$ | 50 | — | 1.03 |
| H$_2$SO$_4$ | 50 | CH$_3$OH/H$_2$O | 0.274 |
| H$_2$SO$_4$ | 50 | Toluene | 0.638 |
| H$_2$SO$_4$ | 50 | Toluene/H$_2$O | 0.681 |
| H$_2$SO$_4$ | 50 | CH$_3$OH/CH$_2$Cl$_2$/H$_2$O | 0.160 |
| TSA | 10 | — | 29.8 |
| TSA | 10 | CH$_3$OH/CH$_2$Cl$_2$/H$_2$O | 2.454 |
| TSA | 10 | Stueben | 1.513 |
| MSA | 5 | — | 0.0598 |
| MSA | 5 | Toluene/H$_2$O | 0.0583 |
| MSA | 5 | CH$_3$OH/CH$_2$Cl$_2$/H$_2$O | 0.016 |
| AlCl$_3$ | 2 | — | 0.119 |
| AlCl$_3$ | 2 | CH$_3$OH/CH$_2$Cl$_2$H$_2$O | 0.0508 |

The results in Table III dramatically show the improved purity of the product obtained by using the preparation and purification method of this invention. They also show the purity advantage obtained by using methanesulfonic acid in comparison with aluminum chloride.

The substantially pure spirobiindane bisphenols prepared by the method of this invention are useful for the preparation of homo- and copolycarbonates of very high molecular weight. In the absence of molecular weight control, products are obtained which have substantially higher molecular weights than those previously known.

In the following discussion, particular reference will be made to homopolycarbonates since the properties thereof are readily ascertainable and may be easily correlated with molecular weight. Two such properties are intrinsic viscosity in chloroform at 25° C. (IV) and glass transition temperature (Tg).

According to the Stueben paper previously cited, a homopolycarbonate having a "reduced viscosity" of 0.75 was obtained by relatively conventional interfacial polymerization. It should be noted that the reduced viscosity" parameter is not equivalent to IV, which is much lower at comparable molecular weight. The aforementioned U.S. Pat. No. 4,552,949 describes a similarly prepared SBI homopolycarbonate having a Tg of 207.2° C.

By contrast, homopolycarbonates with Tg values up to about 230° C. have been obtained from the substantially pure SBI products of the present invention. It is known in the art that Tg values increase with increasing molecular weight (and hence with increasing IV) up to a maximum value and then remain constant as molecular weight increases further. Thus, the homopolycarbonates obtained from the SBI of this invention have substantially higher molecular weights than those disclosed in the prior art.

Reference is now made to the drawing which is a graph in which Tg value for SBI homopolycarbonate is plotted against IV. It will be seen that there is a relatively steady increase in Tg from 215° C. at an IV of 0.1 dl./g. to 230° C. at 0.4 dl./g. Further increases in IV are accompanied by virtually no change in Tg. It is also readily apparent that the homopolycarbonate of Stueben and U.S. Pat. No. 4,552,949 had an IV below 0.1 dl./g., representing a molecular weight much too low to compare to those obtained from the compositions of this invention.

The following example illustrates the preparation of high molecular weight homopolycarbonates from the substantially pure SBI of this invention. Said homopolycarbonates and the method for their preparation are disclosed and claimed in copending, commonly owned application Ser. No. 40,528, filed Apr. 20, 1987.

EXAMPLE 6

To a mixture of 9.86 grams (32.1 mmol.) of SBI prepared substantially as described in Example 1, 75 ml. of methylene chloride and 60 ml. of deionized water was added 50% aqueous sodium hydroxide solution in an amount to adjust the pH of the aqueous phase to 11. Phosgene was passed into the mixture at 0.4 grams per minute, with stirring. After 25%, 50% and 75% of the theoretical amount of phosgene had been added, additional 9.86-gram portions of SBI were introduced and phosgene addition was continued. The total SBI used was 39.5 grams (128 mmol.).

After the final addition of SBI, 3.01 ml. of a 1.05M triethylamine solution in methylene chloride (1.6 mmol. of triethylamine) was added and phosgene addition was continued. When the amount of phosgene added was 130% of theoretical, the mixture was diluted with 200 ml. of methylene chloride and the organic phase was separated and washed with 3% aqueous hydrochloric acid solution and deionized water. Acetone, 10 ml., was added and the mixture was agitated in a Waring blender with the addition of 250 ml. of methanol. The precipitated SBI homopolycarbonate was filtered and dried in an oven at 100° C.

The properties of the polymers obtained, in comparison to two controls, are given in Table IV. Weight average molecular weights are determined by gel permeation chromatography relative to polystyrene.

TABLE IV

| | Ex. 6 | Control A | Control B |
|---|---|---|---|
| SBI prepn. method | Ex. 1 | Ex. 1 | Stueben |
| Polycarbonate prepn. method | Ex. 6 | Stueben | Stueben |
| Mw | 611,000* | 52,600 | 85,000 |
| IV, dl./g. | 1.41 | 0.296 | 0.353 |
| Tg, °C. | 230 | 222 | 237 |

The molecular weight for the product of Example 6 is marked with an asterisk because it is only an approximation, having been determined on an apparatus calculated to read accurately only up to about 100,000. It is apparent, however, from the molecular weight and IV values that the polymer of Example 6 had a much higher molecular weight than those of the controls.

It is also apparent from the Tg value of 237° C. for the product of Control B that it does not represent a typical SBI homopolycarbonate, since the highest obtainable Tg value is normally about 230° C. The high molecular weight and Tg value for this polymer are believed to be evidence of some form of branching or crosslinking, possibly involving impurities in the SBI sample. It is therefore evident that the substantially pure SBI of the present invention can be used to prepare homopolycarbonates with a much higher molecular weight than those previously known.

What is claimed is:

1. A method for preparing a substantially pure spirobiindane bisphenol of the formula

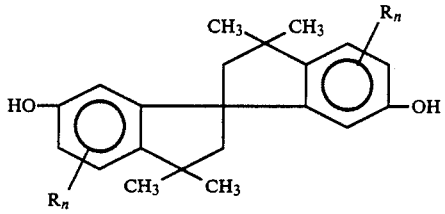

wherein each R is independently $C_{1-4}$ primary or secondary alkyl or halo and n is from 0 to 3, which comprises the steps of:

(A) reacting at least one of bisphenols of the formula

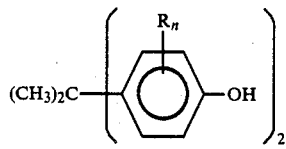

and isopropenylphenols of the formula

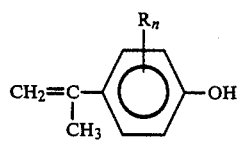

by contact at a temperature in the range of about 100°–200° C. with an acidic catalyst selected from the group consisting of alkanesulfonic acids and polyvalent metal halides which are strong Lewis acids, thereby producing a crude spirobiindane bisphenol;

(B) removing a major proportion of the by-products including phenols of the formula

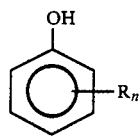

and 1-(4-hydroxphenyl)indanols of the formula

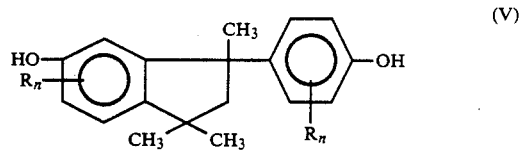

from the crude spirobiindane bisphenol; and (C) further purifying the product of step B by dissolution in a mixture of methanol and methylene chloride followed by precipitation by addition of water.

2. A method according to claim 1 wherein the catalyst is an alkanesulfonic acid.

3. A method according to claim 2 wherein the alkanesulfonic acid is methanesulfonic acid.

4. A method according to claim 3 wherein n is 0.

5. A method according to claim 4 wherein the reactant in step A is bisphenol A.

6. A method according to claim 4 wherein the reactant in step A is 4-isopropenylphenol.

7. A method according to claim 1 wherein the catalyst is a metal halide.

8. A method according to claim 7 wherein the metal halide is $AlCl_3$, $AlBr_3$, $AlI_3$, $GeCl_2$, $GaCl_3$, $GaBr_3$, $GaI_3$, $ZrCl_4$, $HfCl_4$, $HfBr_4$, $HfI_4$, $SbF_5$, $NbF_5$, $NbCl_5$, $TaF_5$, $TaCl_5$, $TaBr_5$, $MoF_6$ or $MoCl_5$.

9. A method according to claim 8 wherein the metal halide is aluminum chloride.

10. A method according to claim 1 wherein stage A is conducted in the melt.

11. A method according to claim 1 wherein stage A is conducted in solution.

12. A method according to claim 1 wherein phenols of formula IV are removed by at least one of water washing and steam distillation.

13. A method according to claim 12 wherein 1-(4-hydroxyphenol)indanols of formula V are removed by dissolution in an organic liquid which is a solvent therefor but which does not dissolve the spirobiindane bisphenol in major amounts.

14. A method according to claim 13 wherein the organic liquid is methylene chloride.

15. A method according to claim 13 wherein the volume ratio of methanol to methylene chloride in stage C is about 3–6:1 and the volume ratio of water to total methanol and methylene chloride is about 0.8–1.2:1.

16. A method according to claim 14 wherein n is 0.

17. A method according to claim 16 hwerein the reactant in step A is bisphenol A.

18. A method according to claim 16 wherein the reactant in step A is 4-isopropenylphenol.

19. Substantially pure 6,6'-dihydroxy-3,3,3',3'-tetramethyl-1,1'-spirobiindane having an absorbance at 350 nanometers of at most 0.06, as measured on a solution of 1 gram thereof in 100 ml. of spectroscopic grade methanol, using a path length of 10 cm.

20. Substantially pure 6,6'-dihydroxy-3,3,3',3'-tetramethyl-1,1'-spirobiindane having an absorbance according to claim 19 of at most 0.03.

* * * * *